(12) United States Patent
Blea et al.

(10) Patent No.: US 8,793,456 B2
(45) Date of Patent: *Jul. 29, 2014

(54) AUTOMATED MIGRATION TO A NEW TARGET VOLUME VIA MERGED BITMAPS TO MAINTAIN CONSISTENCY

(71) Applicant: International Business Machines Corporation, Armonk, NY (US)

(72) Inventors: Amy N. Blea, Round Rock, TX (US); David R. Blea, Tucson, AZ (US); Gregory E. McBride, Vail, AZ (US); John J. Wolfgang, Midlothian, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/068,321

(22) Filed: Oct. 31, 2013

(65) Prior Publication Data

US 2014/0059003 A1   Feb. 27, 2014

Related U.S. Application Data

(63) Continuation of application No. 13/592,219, filed on Aug. 22, 2012.

(51) Int. Cl.
*G06F 11/00* (2006.01)
*G06F 11/14* (2006.01)
*G06F 11/20* (2006.01)

(52) U.S. Cl.
CPC ........ *G06F 11/1456* (2013.01); *G06F 11/2074* (2013.01); *G06F 11/2071* (2013.01)
USPC .......................................... 711/162

(58) Field of Classification Search
USPC ......................................................... 711/162
See application file for complete search history.

(56) References Cited

U.S. PATENT DOCUMENTS

| | | | |
|---|---|---|---|
| 7,415,591 B1 | 8/2008 | Todd et al. | |
| 7,793,148 B2 * | 9/2010 | Beardsley et al. | 714/13 |
| 7,818,522 B2 | 10/2010 | Bartfai et al. | |
| 2005/0071708 A1 * | 3/2005 | Bartfai et al. | 714/5 |
| 2014/0059308 A1 | 2/2014 | Blea et al. | |

OTHER PUBLICATIONS

Notice of Allowance and Fee(s) Due from U.S. Appl. No. 13/592,219 dated Mar. 14, 2014.

* cited by examiner

*Primary Examiner* — Matthew Bradley
*Assistant Examiner* — Craig Goldschmidt
(74) *Attorney, Agent, or Firm* — Zilka-Kotab, PC

(57) ABSTRACT

Aspects of the present invention relate to data migration and/or disaster recovery. One embodiment enables merging of bitmaps to allow for automation of the process of switching to a different target volume on the same storage subsystem without major interruption of data recovery capability and limited interruption of host I/O to the source volumes during the migration. In one approach, the migration of data onto a new target volume within the same storage subsystem as the original target volume is automated, without requiring the user to manually create or remove any new copy relationships.

8 Claims, 6 Drawing Sheets

AUTOMATED MIGRATION TO A NEW TARGET VOLUME VIA MERGED BITMAPS TO MAINTAIN CONSISTENCY

RELATED APPLICATIONS

This application is a continuation of copending U.S. patent application Ser. No. 13/592,719, filed Aug. 22, 2012, which is herein incorporated by reference.

BACKGROUND

The present invention relates to data storage, and more particularly, to migrating data from one volume to a new target volume by merging bitmaps to maintain consistency.

Using conventional data storage systems, there is no automated way to migrate data from one target volume to a new target volume on the same storage system wink maintaining disaster recovery capability. There are instances during normal operation of the data storage system when a user would desire for a different target volume to be used for replication of data, such as a volume on a higher performing disk in the system for improved performance, for reconfiguration purposes, etc. Currently, in order to achieve this switchover between target volumes, the process is manually performed, which is time consuming, error prone, and could potentially result in data loss. This manual process may become even more difficult when using a copy services solution that provides managed consistency across multiple copy relationship pairings because, generally, the need to switch volumes will only affect a few of the pairings within that consistency group/session. In order to perform this manually, the user would first have to remove the copy pairings for those volumes which form the session and then terminate the relationships. Then, a new relationship is established between the original source volume and the new target volume, and all of the data must be copied over. In order to maintain the integrity of the consistency group/session, this would have to be done outside of the consistency group/session and then added in once the volumes reach full duplex. Of course, beside the concern for errors, the user's data is not being replicated consistently throughout this manual and error-prone process, which introduces the possibility of replication errors and loss of data.

Therefore, a storage solution which automates the migration of data from one volume to a new target volume while maintaining consistency would be beneficial.

SUMMARY

In one embodiment, a method for switching a target in a disaster recovery configuration includes receiving instruction to change a target in a disaster recovery configuration, the disaster recovery configuration including: a source volume from which data is copied in a first remote mirror relationship, the source volume being accessible to an application and an original target volume to which data is copied in the first remote mirror relationship; receiving indication to switch the disaster recovery configuration to a new target volume located on a storage subsystem common to the original target volume, establishing an incremental point-in-time (PIT) copy relationship between the original target volume and the new target volume, executing the PIT copy until out-of-sync (OOS) tracks from the source volume to the original target volume are below a predetermined threshold, merging an incremental PIT bitmap representing the PIT copy relationship between the original target volume and the new target volume with a first remote mirror bitmap representing the first remote mirror relationship between the source volume and the original target volume to create a merged remote mirror bitmap, terminating, the PIT copy relationship and the first remote mirror relationship, and establishing a second remote mirror relationship between the source volume and the new target volume using a resynchronization option that uses the merged remote mirror bitmap.

Other aspects and embodiments of the present invention will become apparent from the following detailed description, which, when taken in conjunction with the drawings, illustrate by way of example the principles of the invention.

DETAILED DESCRIPTION

Figure 1:
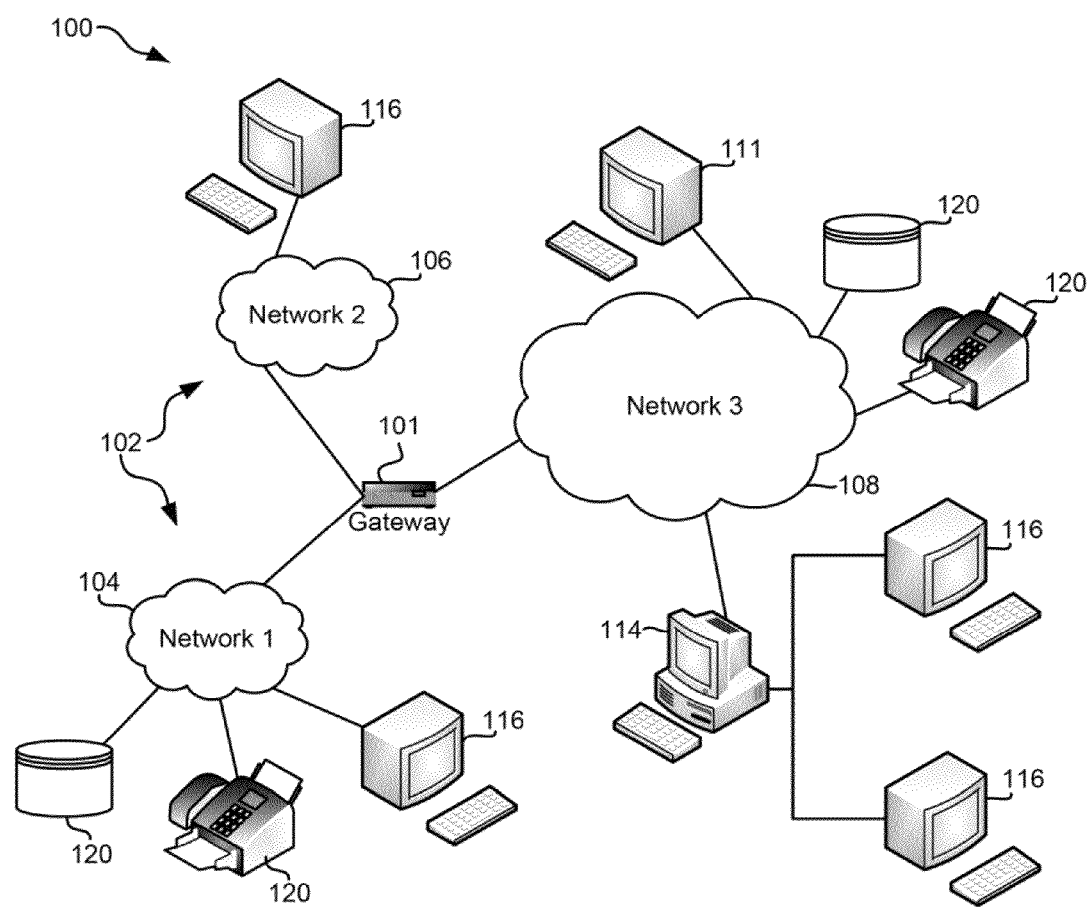
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described, features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a" "an," and "the" include plural referents unless otherwise specified.

According to one embodiment, bitmaps may be merged in order to allow for the automation of the process of switching to a different target volume on the same storage subsystem without major interruption of disaster recovery capability and limited interruption of host I/O to any source volumes during the migration process. The automatic migration of data onto a new target volume within the same storage subsystem as the original target volume, as described herein according to various embodiments, without requiring the user to manually create or remove any new copy relationships is a great improvement upon what is currently done in the field. There are many advantages to automatic migration, such as significant time savings, reducing the large margin for error in removing and re-adding affected pairs into a consistency group/session, etc.

In one general embodiment, a method for switching a target in a disaster recovery configuration includes receiving instruction to change a target in a disaster recovery configuration, the disaster recovery configuration including: a source volume from which data is copied in a first remote mirror relationship, the source volume being accessible to an application and an original target volume to which data is copied in the first remote mirror relationship; receiving indication to switch the disaster recovery configuration to a new target volume located on a storage subsystem common to the original target volume, establishing an incremental point-in-time (PIT) copy relationship between the original target volume and the new target volume, executing the PIT copy until out-of-sync (OOS) tracks from the source volume to the original target volume are below a predetermined threshold, merging an incremental PIT bitmap representing the PIT copy relationship between the original target volume and the new target volume with a first remote mirror bitmap representing the first remote mirror relationship between the source volume and the original target volume to create a merged remote mirror bitmap, terminating the PIT copy relationship and the first remote mirror relationship, and establishing a second remote mirror relationship between the source volume and the new target volume using a resynchronization option that uses the merged remote mirror bitmap.

In another general embodiment, a system includes a source volume from which data is copied in a first remote minor relationship, the source volume being accessible to an application, a storage subsystem including: an original target volume to which data is copied in the first remote mirror relationship and a new target volume; logic adapted for receiving instruction to change a target in a disaster recovery configuration including the source volume and the original target volume, logic adapted for receiving indication to alter the disaster recovery configuration to copy data from the source volume to the new target volume instead of the original target volume, logic adapted for establishing an incremental PIT copy relationship between the original target volume and the new target volume, logic adapted for executing the PIT copy until OOS tracks from the source volume to the original target volume are below a predetermined threshold, logic adapted for merging an incremental PIT bitmap representing the PIT copy relationship between the original target volume and the new target volume with a first remote mirror bitmap representing the first remote mirror relationship between the source volume and the original target volume to create a merged remote mirror bitmap, logic adapted for terminating the PIT copy relationship and the first remote mirror relationship, and logic adapted for establishing a second remote mirror relationship between the source volume and the new target volume using a resynchronization option that uses the merged remote mirror bitmap.

In yet another general embodiment, a computer program product for switching a target in a disaster recovery configuration includes a computer readable storage medium having computer readable program code embodied therewith, the computer readable program code including computer readable program code configured for receiving instruction to change a target in a disaster recovery configuration, the disaster recovery configuration including: a source volume from which data is copied in a first remote mirror relationship, the source volume being accessible to an application and an original target volume to which data is copied in the first remote mirror relationship; computer readable program code configured for receiving indication to switch the disaster recovery configuration to a new target volume located on a storage subsystem common to the original target volume, computer readable program code configured for establishing an incremental PIT copy relationship between the original target volume and the new target volume, computer readable program code configured for executing the PIT copy until OOS tracks from the source volume to the original target volume are below a predetermined threshold, computer readable program code configured for merging an incremental PIT bitmap representing the PIT copy relationship between the original target volume and the new target volume with a first remote mirror bitmap representing the first remote mirror relationship between the source volume and the original target volume to create a merged remote mirror bitmap, computer readable program code configured for terminating the PIT copy relationship and the first remote mirror relationship, and computer readable program code configured for establishing a second remote mirror relationship between the source volume and the new target volume using a resynchronization option that uses the merged remote mirror bitmap.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable, signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection ma be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. As shown in FIG. 1, a plurality of remote networks 102 are provided including a first remote network 104 and a second remote network 196. A gateway 101 may be coupled between the remote networks 102 and a proximate network 108. In the context of the present network architecture 100, the networks 104, 106 may each take any form including, but not limited to a LAN, a WAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." in cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 2:
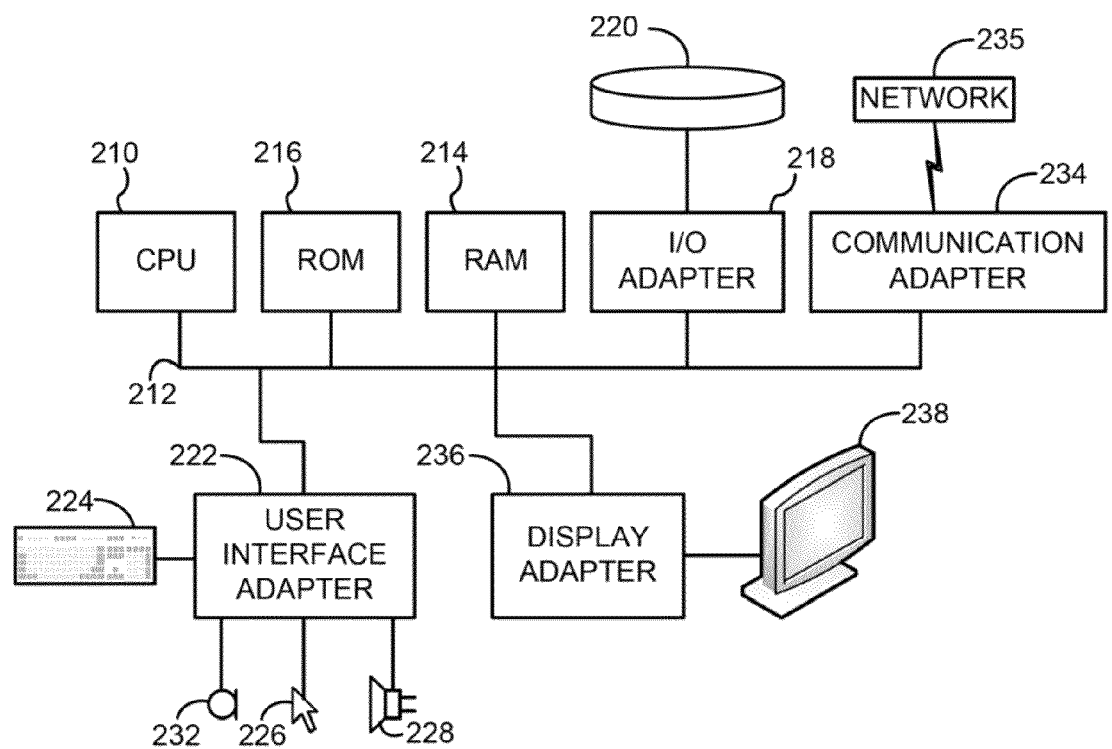
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. FIG. 2 illustrates a typical hardware configuration of a workstation having a central processing unit (CPU) 210, such as a microprocessor, and a number of other units interconnected via one or more buses 212 which may be of different types, such as a local bus, a parallel bus, a serial bus, etc., according to several embodiments. Other types of processors may also be used, such as an integrated circuit (IC), an application specific integrated circuit (ASIC), a field programmable gate array (FPGA), or any other type of processor known in the art.

The workstation shown in FIG. 2 includes a Random Access Memory (RAM) 214, Read Only Memory (ROM) 216, an I/O adapter 218 for connecting, peripheral devices such as disk storage units 220 to the one or more buses 212, a user interface adapter 222 for connecting a keyboard 224, a mouse 226, a speaker 228, a microphone 232, and/or other user interface devices such as a touch screen, a digital camera (not shown), etc., to the one or more buses 212, communication adapter 234 for connecting the workstation to a communication network 235 (e.g., a data processing network) and a display adapter 236 for connecting the one or more buses 212 to a display device 238.

The workstation may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

According to various embodiments, any copy services management tool may be used in conjunction with the migration methods described herein. In one exemplary embodiment, IBM's Tivoli Storage Productivity Center for Replication may be used.

Figure 3:
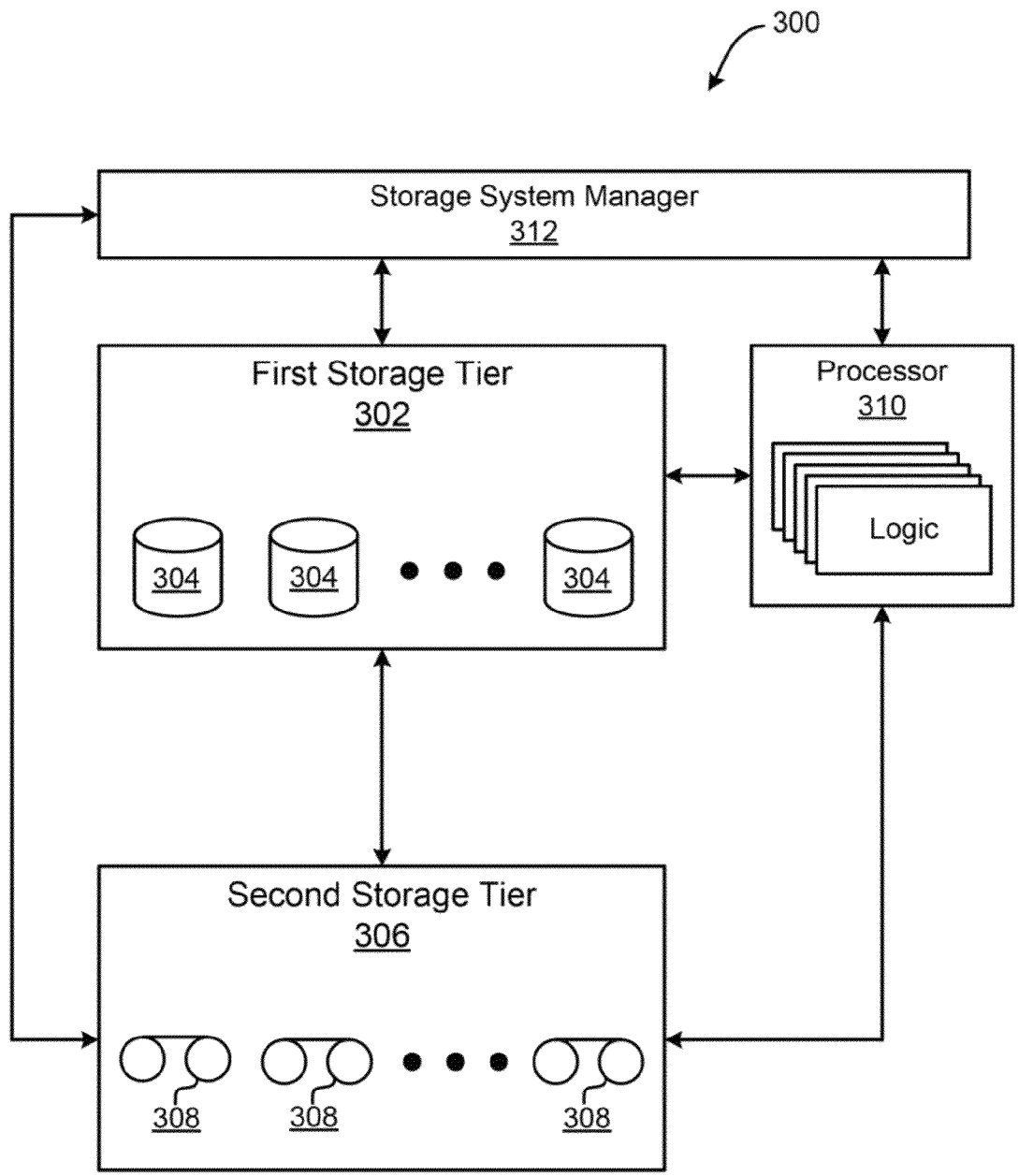
FIG. 3 is a simplified schematic of a storage system, according to one embodiment.
Figure 4A:
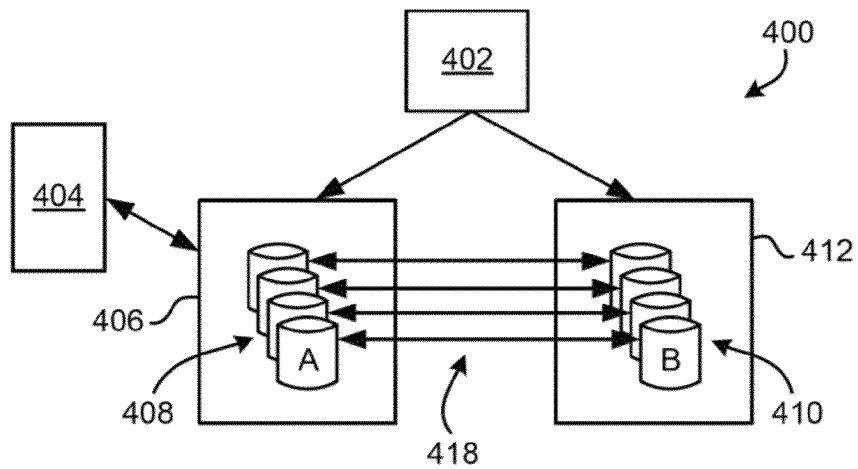
FIGS. 4A-4D show a system as a target volume is switched in a disaster recovery relationship, according to one embodiment.
Figure 4B:
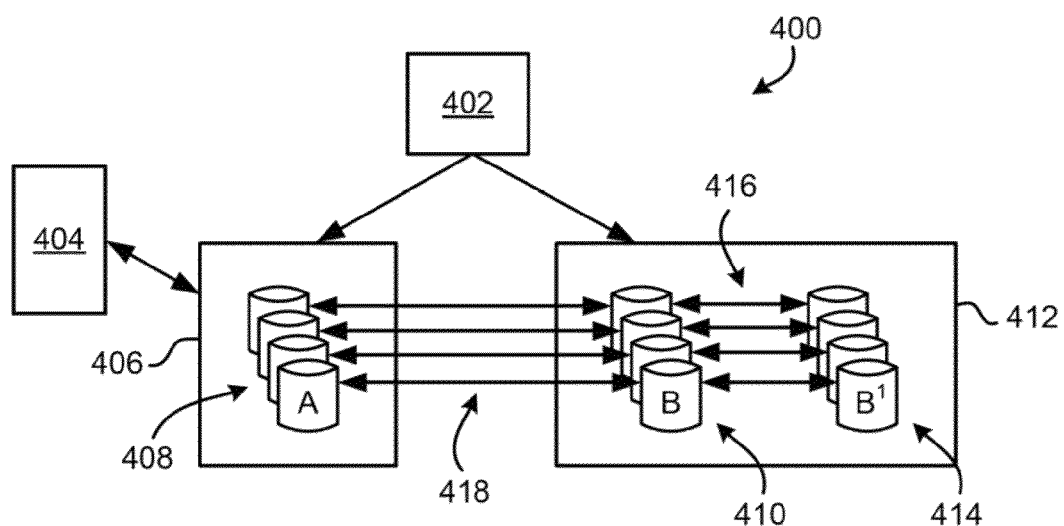
Figure 4C:
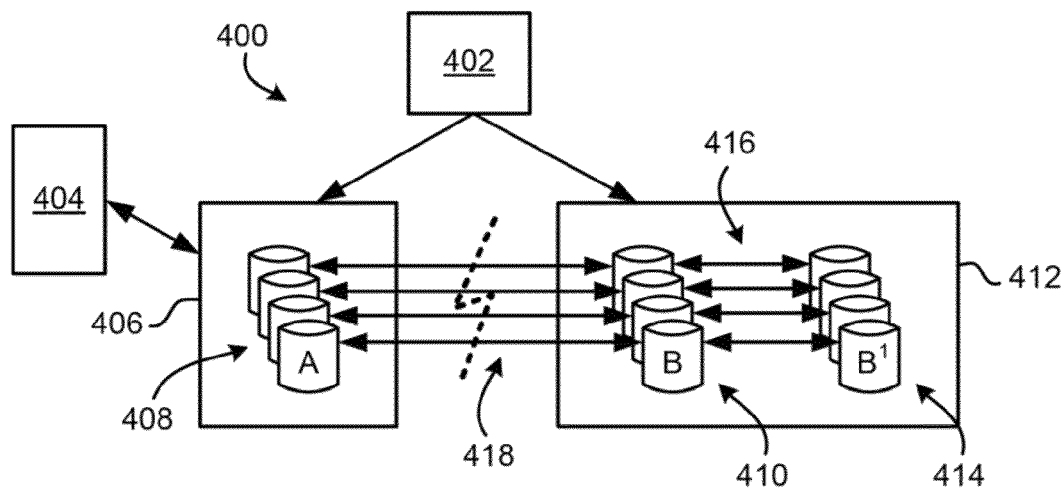
Figure 4D:
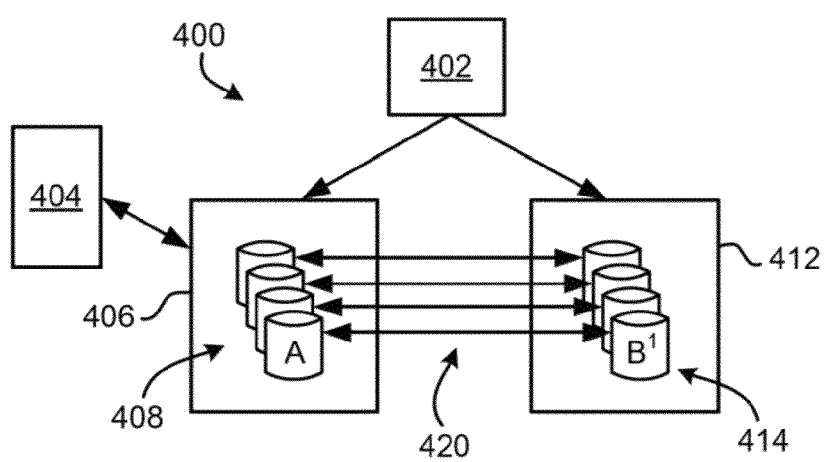

Referring to FIG. 3, a storage system 300 is shown, according to one embodiment. The storage system includes a first storage tier 302 and a second storage tier 306. The first storage tier 302 includes random access storage media 304, and the second storage tier 306 includes sequential access storage media 308. The storage system 300 also includes a processor 310 for executing logic therein, and a storage system manager 312. The processor 310 may be of any type known in the art, such as a central processing unit (CPU), a field programmable gate array (FPGA), an application specific integrated circuit (ASIC), etc. The logic, which is described below may be implemented in hardware or software, or a combination of hardware and software, as would be known to one of skill in the art.

According to some embodiments, the storage system 300 includes logic for storing files in at least one directory in the first storage tier 302, logic for creating an index file which includes entries for each file stored in the at least one directory in the first storage tier 302, logic for aggregating in blocks the files stored in the at least one directory in the first storage tier 302, logic for opening a session with the storage system manager 312, logic for writing out the blocks of aggregated files stored in the at least one directory in the first storage tier 302 to the second storage tier 306, logic for writing metadata and storage location information for each aggregated block written to the second storage tier 306 to the index file, logic for closing the index file, and logic for closing the session with the storage system manager 312.

In one preferred embodiment, the storage system 300 may include logic for copying the index file to the second storage tier 306. This allows for a location of the blocks of files to be determined without accessing another system or storage media other than the second storage tier 306 where the aggregated blocks of files are now stored.

In one embodiment, the random access storage media 304 may include magnetic disk media. In another embodiment, the sequential access storage media 308 may include magnetic tape media.

In one approach, the index file may be a markup language index file, such as an XML index file, an HTML index file, etc.

In one embodiment, as shown in FIGS. 4A-4D, copy services management software 402 may be used to control a switch from replicating source volume(s) A 408 from original target volume(s) B 410 to new target volumes) B¹ 414. In order to accomplish this, a command may be issued to copy services management software 402 to switch one volume B 410 of a pairing (volume A 408 and volume B 410) to a different target volume B' 414. For the remainder of these descriptions, the source and target volume will be referred to in the singular; however, this in no way limits the ability to replicate and/or redirect a copy service relationship between multiple volumes.

As shown in FIGS. 4A-4D, a system 400 may comprise a source volume A 408 on a Logical SubSystem (LSS) 406 from which data is copied in a first remote mirror relationship 418 (such as a metro-mirror relationship, in accordance with one embodiment), the source volume A 408 being accessible to an application 404. The system 400 also comprises a storage subsystem 412 (logical or physical), the storage subsystem 412 comprising an original target volume B 410 to which data is copied in the first remote mirror relationship 418, and a new target volume B¹ 414.

Also, although the source and target volumes may be on separate systems (source volume A 408 is on another storage subsystem 406 while original target volume 410 is on storage subsystem 412), all storage subsystems are included in the system 400.

In one embodiment, storage subsystem 406 (the source storage system) may be the same as storage subsystem 412 the target storage system); however, this is not a desirable configuration since the existence of the backup would be rendered useless in the event that storage subsystem 412 failed, which would take down the original and backup volumes. Accordingly, it is better for the storage subsystem 406 and the storage subsystem 412 to be on different physical equipment and/or components.

According to various embodiments, the user may be asked to select the existing pairing that will be changed (A→B), or the copy services management software 402 may determine which pairing to change based on some factors or conditions, which may be specified by the user. Then, the user may select a storage subsystem 412 and the select the volume on that storage subsystem 412 to be used as the new target volume B¹ 414.

When the user has completed these selections (or the copy services management software 402 has made these determinations automatically), the copy services management software 402 may automatically establish an incremental point-in-time (PIT) copy service relationship 416 with a background copy between the original target volume B 410 and the new target volume B¹ 414. As part of this step, the storage subsystem 400 may also establish a change recording bitmap to keep track of all the changes to the original target volume B 410 that occurred after the point-in-time relationship 416 was established.

When the background copy completes to the new target volume B¹ 414, the copy services management software 402 continues to incrementally flash 416 the original target volume B 410 to the new target volume B¹ 414, until the number of mismatched tracks or out-of-sync (OOS) tracks, represented in the change recording bitmap, drops below a threshold, which may be a number of tracks (e.g., 10 tracks, 100 tracks, 500 tracks, etc. a percentage of tracks to be transferred (e.g., 20%, 10%, 5%, 1%, 0.5% remaining, etc.), or any other threshold as would be understood by one of skill in the art upon reading, the present descriptions. This helps to minimize the duration of the Long Busy and thus minimize the impact to an application 404 which utilizes the data stored to the source volume A 408.

At this point, write I/O activity is temporarily held (resulting in a Long Busy), the mirror copy services relationship 418 between the original source volume A 408 and the target volume B 410 is terminated, and the incremental PIT change recording bitmap between the original target volume B 410 and the new target volume B¹ 414 is merged with the synchronous replication out-of-sync bitmap between the original source volume A 408 and the original target volume B 410, and a synchronous copy service relationship 420 between the original source volume A 408 and the new target volume B¹ 414 is established.

What is meant by "merging" the bitmaps is explained in more detail here. Each bitmap comprises the changes that have been made to the particular volume for which that bitmap represents. For example, the incremental PIT change recording bitmap represents changes made to the original target volume B 410 after the new target volume B¹ 414 was created that need to be copied to the new target volume B¹ 414. By merging bitmaps, it is assured that all tracks in a volume, whether they were updated on the source volume or the original target volume for the copy-services relationship with the source volume, get overwritten by the tracks on the source volume to ensure consistency at the target volume site and the new target volume B$^1$ 414.

In one approach, the storage subsystem 400 drops the relationship into a copy-pending state and uses the information in the merged bitmap to drive all necessary changes to the new target volume B$^1$ 414 to ensure it is identical to the source volume A 408. By doing this, if the metro mirror bitmap between the original source volume A 408 and target volume B$^1$ 414 is not all null entries e.g., 0's) due to suspension, or if the pairs are not duplex at the time of the relationship switch, etc., the merging of bitmaps allows any additional updates that have not been processed to be copied over to the new target volume B$^1$ 414 without loss of any data.

The new metro mirror relationship may quickly copy the difference tracks represented in the bitmap from the original source volume A 408 to the target volume B$^1$ 414. Once that completes, the write I/O is allowed to continue as per normal operation. After that, the synchronous replication between the source volume A 408 and the new target volume B$^1$ 414 will continue in a standard fashion.

This enables a new and valuable feature for the copy services management software 402. This feature is not available currently in any known products.

According to one exemplary embodiment, when a user chooses to migrate a disaster recovery configuration to a different target volume, the copy services management software may lead the user through the following steps:

1) When all pairs are full duplex and the session is in a prepared state, a "Change Target" command may become available to the user.

2) When the user selects/issues the "Change Target" command, the user may be prompted for the following information: a) select the existing pair or multiple pairs that will be moved to a different target volume; b) select the new target volume for each pair. These target volumes are on the same storage subsystem as the original target volumes.

Once the information is submitted, the copy services management software may then do the following:

1) Establish an incremental PIT copy (flashcopy) relationship between the original target volume(s) and the new target volume(s).

2) When the background copy is complete between the original target volume B and the new target volume B$^1$, B is continued to be incrementally flashed to B$^1$ until the out-of-sync (OOS) tracks from the source volume A to the original target volume B is below a predetermined threshold.

3) Do not allow an updates to the associated source volumes A (Long Busy).

4) Merge the incremental PIT bitmap between the original target volume B and the new target volume B$^1$ with the remote mirror bitmap between the source volume A and the original target volume B to create a new remote mirror bitmap.

5) Terminate both the PIT relationships and remote mirror relationships.

6) Establish remote mirror relationships between the source volume A and the new target volume B$^1$ with a resynchronization option that uses the merged bitmap.

7) Wait until the copy from source volume A to the new target volume B$^1$ achieves full duplex.

8) Release the Long Busy condition to allow I/O to the source volume A.

After this step completes, the copy services management software may replace the original target volume B with the new target volume B$^1$ for the affected session and allow the user to carry out all the available commands on the session with the new target volume B$^1$. With this process, if a disaster should happen to the source volume A and/or the storage subsystem after the switch is made, the user is capable of recovering from the original target volume B.

Figure 5:
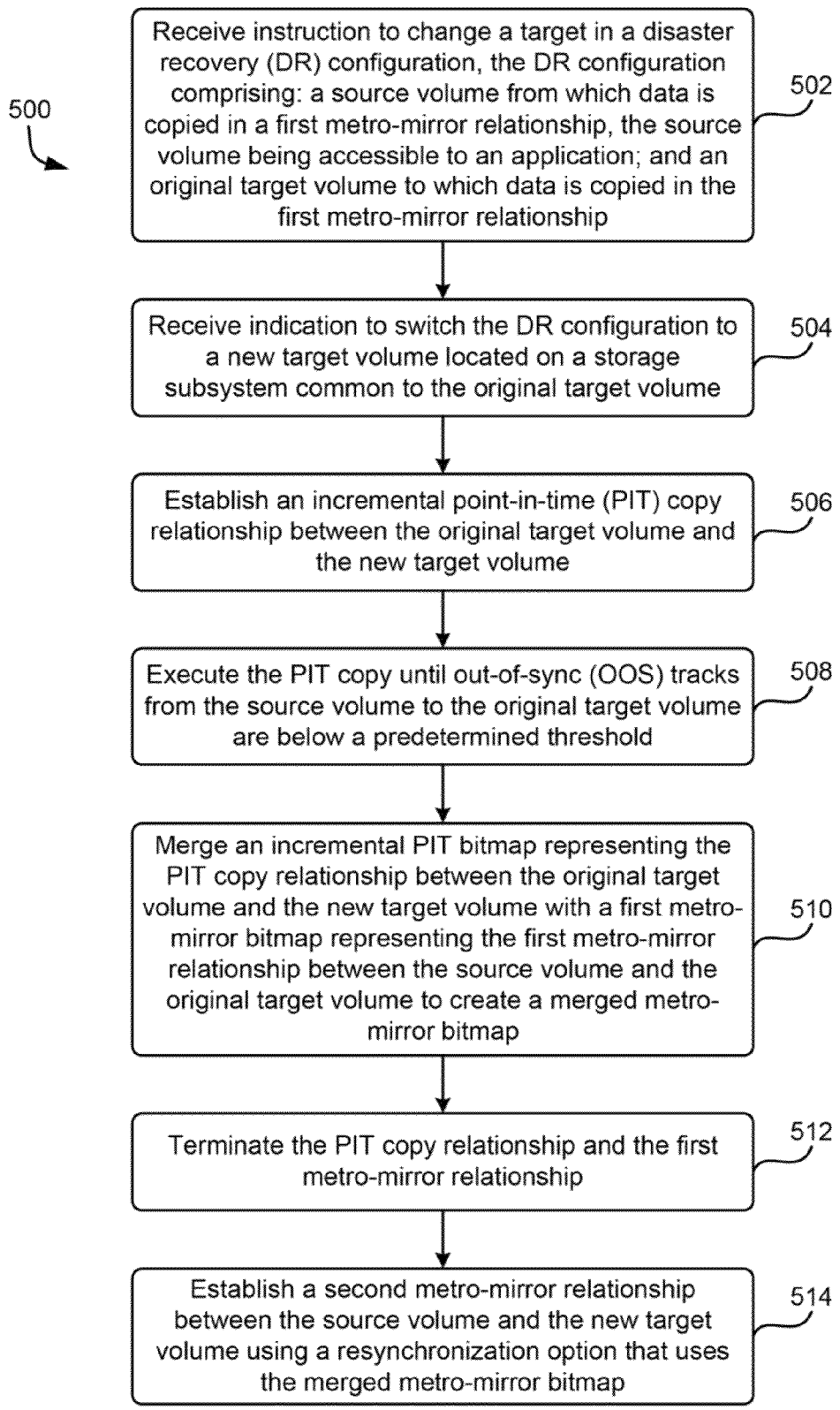
FIG. 5 is a flowchart of a method, according to one embodiment.

In accordance with one embodiment, as shown in FIG. 5, a method 500 for switching a target in a disaster recovery configuration is shown. The method 500 may be carried out in any desired environment, and may include embodiments and or approaches described in relation to FIGS. 1-4C, among others. Of course, more or less operations than those shown in FIG. 5 may be performed in method 500 as would be known to one of skill in the art.

In operation 502, instruction to change a target in a disaster recovery configuration is received. In one approach, the disaster recovery configuration may comprise a source volume from which data is copied in a first remote mirror relationship and an original target volume to which data is copied in the first remote mirror relationship. The source volume is also accessible to at least one application for use in functions of the application, such as data writing and/or reading.

In operation 504, indication is received to switch to a new target volume in the disaster recovery configuration, the new target volume being located on a storage subsystem common to the original target volume.

In operation 506, an incremental PIT copy relationship is established between the original target volume and the new target volume. This PIT may be established using copy services management software or any other suitable device, software, logic, and/or combination thereof.

In operation 508, the PIT copy is executed until OOS tracks from the source volume to the original target volume are below a predetermined threshold. The threshold may be a number of tracks, a percentage of tracks being transferred, etc. In some exemplary embodiments, the number of track threshold may be less than 100 tracks, 50 tracks, 500 tracks, 1000 tracks, etc., or the percentage of tracks may be less than 10% tracks OOS, 5% tracks OOS, 1% tracks OOS 0.5% tracks OOS, etc.

In operation 510, an incremental PIT bitmap representing the PIT copy relationship between the original target volume and the new target volume is merged with a first remote mirror bitmap representing the first remote mirror relationship between the source volume and the original target volume to create a merged remote mirror bitmap.

In one embodiment, this merged remote mirror bitmap may be used in future remote mirror operations between the source volume and the new target volume.

In operation 512, the PIT copy relationship and the first remote mirror relationship are terminated, effectively stopping the copying processes between the source volume and the original target volume.

In operation 514, a second remote mirror relationship is established between the source volume and the new target volume using a resynchronization option that uses the merged remote mirror bitmap. In this way, the source volume is still being duplicated onto the new target volume, and no data is lost in the transition from the original target volume and the new target volume.

In one embodiment, the method 500 may further comprise determining that the original target volume and the source volume are full duplex before establishing the PIT copy relationship. In this way, it can be assured that the original target volume has a full copy of the data from the source volume before duplicating this data on the new target volume otherwise, data may be lost in the transition.

In another embodiment, the method 500 may further comprise preventing any I/O access from occurring to volumes associated with the source volume after the OOS tracks are below the predetermined threshold, also referred to as a Long Busy. Any method of causing this Long Busy ma be used, as known in the art. In a further embodiment, the method 500 may further comprise allowing I/O access to volumes associated with the source volume after the second remote mirror relationship between the source volume and the new target volume achieves full duplex. This may be referred to as cancelling the Long Busy, and allowing write and access operations on the source volume again.

In one approach, the original target volume and the new target volume may be located on the same storage subsystem.

In more embodiments, a plurality of source volumes may be in one or more remote mirror relationships with a plurality of original target volumes. In this way, multiple remote mirror relationships may exist between multiple volumes. In one approach, the plurality of original target volumes may be distributed across two or more storage subsystems in order to spread out resources and aid in workload balancing. Of course, more target volumes may exist on some storage subsystems than on others, or they may be distributed evenly. In an alternate embodiment, the plurality of original target volumes may be consolidated onto a single storage subsystem in order to minimize management of resources. Furthermore, these descriptions in no way hamper the ability for the original target volume(s) and the new target volume(s) to be located on the same storage subsystem or different storage subsystems.

In another embodiment, the method 500 may further comprise issuing a message to a user requesting information about changes to be made to the disaster recovery configuration. In response to this message, the instruction to change the target in the disaster recovery configuration may be received.

In some more embodiments, ail or any portion of method 500 may be implemented in a system and/or a computer program product.

In one such embodiment, a system includes a source volume from which data is copied in a first remote minor relationship, the source volume being accessible to an application and a storage subsystem comprising an original target volume to which data is copied in the first remote mirror relationship and a new target volume. The system also comprises logic adapted for receiving instruction to change a target in a disaster recover configuration comprising the source volume and the original target volume, logic adapted for receiving indication to alter the disaster recovery configuration to copy data from the source volume to the new target volume instead of the original target volume, logic adapted for establishing an incremental PIT copy relationship between the original target volume and the new target volume, logic adapted for executing the PIT copy until OOS tracks from the source volume to the original target volume are below a predetermined threshold, logic adapted for merging an incremental PIT bitmap representing the PIT copy relationship between the original target volume and the new target volume with a first remote mirror bitmap representing the first remote mirror relationship between the source volume and the original target volume to create a merged remote mirror bitmap, logic adapted for terminating the PIT copy relationship and the first remote mirror relationship, and logic adapted for establishing a second remote mirror relationship between the source volume and the new target volume using a resynchronization option that uses the merged remote mirror bitmap.

In another such embodiment, a computer program product for switching a target in a disaster recovery configuration comprises a computer readable storage medium having computer readable program code embodied therewith. The computer readable program code comprises: computer readable program code configured for receiving instruction to change a target in a disaster recovery configuration, the disaster recovery configuration comprising a source volume accessible to an application from which data is copied in a first remote mirror relationship, and an original target volume to which data is copied in the first remote mirror relationship; computer readable program code configured for receiving indication to switch the disaster recovery configuration to a new target volume located on a storage subsystem common to the original target volume; computer readable program code configured for establishing, an incremental PIT copy relationship between the original target volume and the new target volume; computer readable program code configured for executing the PIT copy until OOS tracks from the source volume to the original target volume are below a predetermined threshold; computer readable program code configured for merging an incremental PIT bitmap representing the PIT copy relationship between original target volume and the new target volume with a first remote mirror bitmap representing the first remote mirror relationship between the source volume and the original target volume to create a merged remote mirror bitmap; computer readable program code configured for terminating the PIT copy relationship and the first remote mirror relationship; and computer readable program code configured for establishing a second remote minor relationship between the source volume and the new target volume using a resynchronization option that uses the merged remote mirror bitmap.

Of course, any of the embodiments and/or approaches described herein may be implemented in either the system or computer program product, as described above, according to a plurality of additional embodiments.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for switching a target in a disaster recovery configuration, comprising:
    receiving instruction to change a target in a disaster recovery configuration, the disaster recovery configuration comprising:
        a source volume from which data is copied in a first remote mirror relationship, the source volume being accessible to an application; and
        an original target volume to which data is copied in the first remote mirror relationship;
    receiving indication to switch the disaster recovery configuration to a new target volume located on a storage subsystem common to the original target volume;
    establishing an incremental point-in-time (PIT) copy relationship between the original target volume and the new target volume;
    executing the PIT copy until out-of-sync (OOS) tracks from the source volume to the original target volume are below a predetermined threshold;
    merging an incremental PIT bitmap representing the PIT copy relationship between the original target volume and the new target volume with a first remote mirror bitmap representing the first remote mirror relationship between the source volume and the original target volume to create a merged remote mirror bitmap;
    terminating the PIT copy relationship and the first remote mirror relationship; and establishing a second remote mirror relationship between the source volume and the new target volume using a resynchronization option that uses the merged remote mirror bitmap.

2. The method as recited in claim 1, further comprising determining that the original target volume and the source volume are full duplex before establishing the PIT copy relationship.

3. The method as recited in claim 1, further comprising preventing any I/O access from occurring to volumes associated with the source volume after the OOS tracks are below the predetermined threshold.

4. The method as recited in claim 3, further comprising allowing I/O access to volumes associated with the source volume after the second remote mirror relationship between the source volume and the new target volume achieves full duplex.

5. The method as recited in claim 1, wherein the original target volume and the new target volume are located on the same storage subsystem.

6. The method as recited in claim 1, wherein a plurality of source volumes are in one or more remote mirror relationships with a plurality of original target volumes, and wherein the plurality of original target volumes are distributed across two or more storage subsystems in order to spread out resources and aid in workload balancing.

7. The method as recited in claim 1, wherein a plurality of source volumes are in one or more remote mirror relationships with a plurality of original target volumes, and wherein the plurality of original target volumes are consolidated onto a single storage subsystem in order to minimize management of resources.

8. The method as recited in claim 1, further comprising issuing a message to a user requesting information about changes to be made to the disaster recovery configuration, wherein the instruction to change the target in the disaster recovery configuration is received in response to the message.

* * * * *